United States Patent
Wang et al.

(10) Patent No.: US 12,413,295 B2
(45) Date of Patent: Sep. 9, 2025

(54) SATELLITE COMMUNICATION METHOD AND APPARATUS

(71) Applicant: HUAWEI TECHNOLOGIES CO., LTD., Guangdong (CN)

(72) Inventors: Xiaolu Wang, Hangzhou (CN); Hejia Luo, Hangzhou (CN); Rong Li, Hangzhou (CN); Bin Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 708 days.

(21) Appl. No.: 17/729,253

(22) Filed: Apr. 26, 2022

(65) Prior Publication Data

US 2022/0255620 A1    Aug. 11, 2022

Related U.S. Application Data

(63) Continuation of application No. PCT/CN2020/124751, filed on Oct. 29, 2020.

(30) Foreign Application Priority Data

Oct. 29, 2019  (CN) .................. 201911035803.X

(51) Int. Cl.
*H04W 74/0833* (2024.01)
*H04B 7/185* (2006.01)
*H04W 56/00* (2009.01)

(52) U.S. Cl.
CPC .... *H04B 7/18513* (2013.01); *H04W 56/0045* (2013.01); *H04W 74/0833* (2013.01)

(58) Field of Classification Search
USPC .......................................... 370/324; 455/431
See application file for complete search history.

(56) References Cited

U.S. PATENT DOCUMENTS

| 12,192,937 | B2 * | 1/2025 | Mahalingam ..... H04W 56/0005 |
| 2020/0413451 | A1 * | 12/2020 | Taherzadeh Boroujeni ................ H04W 56/005 |
| 2022/0201770 | A1 * | 6/2022 | Xu .................... H04W 74/0833 |

(Continued)

FOREIGN PATENT DOCUMENTS

| CN | 105830519 A | 8/2016 |
| CN | 108012329 A | 5/2018 |
| CN | 109152027 A | 1/2019 |

(Continued)

OTHER PUBLICATIONS

3GPP TS 38.211 V15.5.0 (Mar. 2019), "3rd Generation Partnership Project; Technical Specification Group Radio Access Network; NR; Physical Channels and Modulation (Release 15)," Mar. 2019, 96 pages.

(Continued)

*Primary Examiner* — Suhail Khan
(74) *Attorney, Agent, or Firm* — Fish & Richardson P.C.

(57) ABSTRACT

This disclosure provides satellite communication methods and apparatuses. One example method includes that a terminal device determines a first time offset of a first random access response window based on a distance information between a satellite base station and the ground. Based on the first time offset and the first random access response window, the terminal device receives a random access response sent by the satellite base station.

20 Claims, 6 Drawing Sheets

(56) References Cited

U.S. PATENT DOCUMENTS

2022/0225195 A1* 7/2022 Park ................. H04W 36/0061

FOREIGN PATENT DOCUMENTS

| CN | 109788548 | A | 5/2019 |
| CN | 109874168 | A | 6/2019 |
| CN | 110351879 | A | 10/2019 |
| EP | 1508981 | A1 | 2/2005 |
| WO | 2018227793 | A1 | 12/2018 |
| WO | 2019161044 | A1 | 8/2019 |

OTHER PUBLICATIONS

3GPP TS 38.213 V15.5.0 (Mar. 2019), "3rd Generation Partnership Project; Technical Specification Group Radio Access Network; NR; Physical Layer Procedures for Control (Release 15)," Mar. 2019, 104 pages.

3GPP TS 38.321 V15.5.0 (Mar. 2019), "3rd Generation Partnership Project; Technical Specification Group Radio Access Network; NR; Medium Access Control (MAC) Protocol Specification (Release 15)," Mar. 2019, 78 pages.

Extended European Search Report issued in European Application No. 20881820.3 on Oct. 19, 2022, 10 pages.

MediaTek Inc., "Improving Random Access in NTN," 3GPP TSG-RAN WG2 Meeting #106, R2-1905704, Reno, USA, May 13-17, 2019, 5 pages.

Office Action issued in Chinese Application No. 201911035803.X on Aug. 23, 2021, 18 pages (with English translation).

PCT International Search Report and Written Opinion issued in International Application No. PCT/CN2020/124751 on Jan. 18, 2021, 15 pages (with English translation).

* cited by examiner

SATELLITE COMMUNICATION METHOD AND APPARATUS

CROSS-REFERENCE TO RELATED APPLICATIONS

This application is a continuation of International Application No. PCT/CN2020/124751, filed on Oct. 29, 2020, which claims priority to Chinese Patent Application 201911035803.X, filed on Oct. 29, 2019. The disclosures of the aforementioned applications are hereby incorporated by reference in their entireties.

TECHNICAL FIELD

This application relates to the communication field, and more specifically, to a satellite communication method and apparatus in the communication field.

BACKGROUND

In a wireless communication system, a terminal device obtains uplink synchronization with a network device in a random access process. The random access process includes: The terminal device sends a random access preamble to the network device. After receiving the random access preamble, the network device sends a random access response to the terminal device. The terminal device receives the random access response in a random access response window.

In a satellite communication system, because a satellite base station is far away from the terminal device and a delay is large, if the terminal device receives the random access response based on the random access response window, the terminal device cannot receive the random access response. This causes a random access failure.

SUMMARY

This application provides a satellite communication method and apparatus, to improve a random access success rate in a satellite communication system.

According to a first aspect, a satellite communication method is provided, including: A terminal device determines a first time offset of a first random access response window based on information about a distance between a satellite base station and the ground and receives, based on the first time offset and the first random access response window, a random access response sent by the satellite base station.

In the foregoing solution, the terminal device may determine the first time offset of the first random access response window based on the information about the distance between the satellite base station and the ground. When receiving a random access response, the terminal device considers the information about the distance between the satellite base station and the ground. This can improve accuracy of receiving the random access response and increase a random access success rate.

Optionally, the distance information between the satellite base station and the ground may be an orbit altitude of the satellite base station. The terminal device may learn the orbit altitude of the satellite base station in advance, for example, ephemeris information broadcast by the satellite base station includes the orbit altitude.

Optionally, the information about the distance between the satellite base station and the ground may be a straight-line distance between the satellite base station and the terminal device. The terminal device may obtain the straight-line distance from the satellite base station based on a positioning system of the terminal device.

It should be noted that the information about the distance between the satellite base station and the ground may be understood as information about a distance between the satellite base station and a plane on which the terminal device is located.

In a possible implementation, that a terminal device determines a first time offset of a first random access response window based on information about a distance between a satellite base station and the ground includes: The terminal device determines the first time offset of the first random access response window based on information about the orbit altitude of the satellite base station.

Optionally, the information about the orbit altitude of the satellite base station may be the orbit altitude of the satellite base station or a value obtained after the orbit altitude of the satellite base station is scaled, a value obtained by adding a value to the orbit altitude of the satellite base station, or a value obtained by subtracting a value from the orbit altitude of the satellite base station, or the like.

In a possible implementation, that a terminal device determines a first time offset of a first random access response window based on information about a distance between a satellite base station and the ground includes: The terminal device determines the first time offset of the first random access response window based on the information about the orbit altitude of the satellite base station and speed of light.

In a possible implementation, that the terminal device determines the first time offset of the first random access response window based on the information about the orbit altitude of the satellite base station and speed of light includes:

The terminal device determines the first time offset of the first random access response window according to a formula M=kd/c, where d is the orbit altitude of the satellite base station, C is the speed of light, M is the first time offset, k is a configured value or a value specified in a network device protocol, and k may be a real number.

In a possible implementation, the terminal device determines the first time offset of the first random access response window according to a formula M=kd/c:

The terminal device determines the first time offset of the first random access response window according to the following formula (1) or (2):

$$M = 2d/c \quad (1)$$

$$M = 4d/c \quad (2)$$

where d is the orbit altitude of the satellite base station, C is the speed of light, and M is the first time offset.

In a possible implementation, the method further includes: The terminal device receives a first scaling value sent by the satellite base station, where the first scaling value is used to indicate a scaling amount of the first random access response window.

That the terminal device receives, based on the first time offset and the first random access response window, the random access response sent by the satellite base station includes: The terminal device scales the first random access response window based on the first scaling value to obtain a second random access response window and the terminal device receives the random access response sent by the satellite base station after offsetting the second random access response window by the first time offset.

It should be understood that the first scaling value may also be referred to as a first scaling coefficient or a first scaling amount.

In the foregoing technical solution, the first random access response window may be scaled by using the first scaling value to obtain the second random access response window. This can avoid using a fixed first random access response window and improve flexibility and a receiving success rate of receiving the random access response.

In a possible implementation, the method further includes: The terminal device receives a second scaling value sent by the satellite base station, where the second scaling value is used to indicate a scaling amount of the first time offset.

That the terminal device receives, based on the first time offset and the first random access response window, the random access response sent by the satellite base station includes:

The terminal device scales the first time offset based on the second scaling value to obtain a second time offset; and
    the terminal device receives the random access response sent by the satellite base station after offsetting the first random access response window by the second time offset.

It should be understood that the second scaling value may also be referred to as a second scaling coefficient or a second scaling amount.

In the foregoing technical solution, the first time offset may be scaled by using the second scaling value to obtain the second time offset. This can avoid using a fixed first time offset, improve flexibility of moving a random access response window, help the terminal device receive the random access response, and improve a success rate of receiving the random access response by the terminal device.

In a possible implementation, the method further includes: The terminal device receives the first scaling value and the second scaling value that are sent by the satellite base station, where the first scaling value is used to indicate the scaling amount of the first random access response window and the second scaling value is used to indicate the scaling amount of the first time offset.

That the terminal device receives, based on the first time offset and the first random access response window, the random access response sent by the satellite base station includes: The terminal device scales the first random access response window based on the first scaling value to obtain the second random access response window;
    the terminal device scales the first time offset based on the second scaling value to obtain the second time offset; and
    the terminal device receives the random access response sent by the satellite base station after offsetting the second random access response window by the second time offset.

In the foregoing technical solution, it can be avoided that the terminal device uses the fixed first random access response window and the fixed first time offset. This can improve flexibility and a success rate of receiving the random access response by the terminal device by using the random access response window.

According to a second aspect, a satellite communication method is provided, including: A satellite base station sends a first scaling value and/or a second scaling value to a first terminal device, where the first scaling value is used to indicate a scaling amount of a first random access response window of the first terminal device, and the second scaling value is used to indicate a scaling amount of a first time offset of a first random access response window that is determined by the first terminal device based on information about a distance between the satellite base station and the ground; and
    the satellite base station sends a random access response to the first terminal device.

Optionally, the first scaling value may also be referred to as a first scaling coefficient or a first scaling amount. The second scaling value may also be referred to as a second scaling coefficient or a second scaling amount.

In a possible implementation, the satellite base station determines a time offset for detecting a random access preamble window based on a common timing advance and a partial common timing advance, where the partial common timing advance is sent by the satellite base station to the first terminal device; and the satellite base station receives a random access preamble sent by the first terminal device after offsetting the random access preamble window by the time offset.

Optionally, the satellite base station may obtain the time offset of the random access preamble window by subtracting the partial common timing advance from the common timing advance.

According to a third aspect, a satellite communication apparatus is provided. The satellite communication apparatus has a function of implementing the method in any one of the first aspect and the possible implementations of the first aspect. The function may be implemented by using hardware, or may be implemented by hardware executing corresponding software. The hardware or the software includes one or more units corresponding to the foregoing functions.

According to a fourth aspect, a satellite communication apparatus is provided. The satellite communication apparatus has a function of implementing the method in any one of the second aspect and the possible implementations of the second aspect. The function may be implemented by using hardware, or may be implemented by hardware executing corresponding software. The hardware or the software includes one or more units corresponding to the foregoing functions.

According to a fifth aspect, this application provides a terminal device, including a processor and a memory. The memory is configured to store a computer program. The processor is configured to invoke and run the computer program stored in the memory, so that the terminal device performs the method in any one of the first aspect and the possible implementations of the first aspect.

According to a sixth aspect, this application provides a satellite base station, including a processor and a memory. The memory is configured to store a computer program. The processor is configured to invoke and run the computer program stored in the memory, so that the satellite base station performs the method in any one of the second aspect and the possible implementations of the second aspect.

According to a seventh aspect, this application provides a satellite communication system, where the system includes the apparatus provided in the third aspect and the apparatus provided in the fourth aspect.

Alternatively, the system includes the apparatus provided in the fifth aspect and the apparatus provided in the sixth aspect.

According to an eighth aspect, this application provides a computer-readable storage medium. The computer-readable storage medium stores computer instructions. When the computer instructions are run on a computer, the computer is enabled to perform the method in any one of the first aspect and the possible implementations of the first aspect.

According to a ninth aspect, this application provides a computer-readable storage medium. The computer-readable storage medium stores computer instructions. When the computer instructions are run on a computer, the computer is enabled to perform the method in any one of the second aspect and the possible implementations of the second aspect.

According to a tenth aspect, this application provides a chip, including a processor. The processor is configured to read and execute a computer program stored in a memory, to perform the method in any one of the first aspect and the possible implementations of the first aspect.

Optionally, the chip further includes the memory, and the memory and the processor are connected to the memory by using a circuit or a wire.

Further, optionally, the chip further includes a communication interface.

According to an eleventh aspect, this application provides a chip, including a processor. The processor is configured to read and execute a computer program stored in a memory, to perform the method in any one of the second aspect and the possible implementations of the first aspect.

Optionally, the chip further includes the memory, and the memory and the processor are connected to the memory by using a circuit or a wire.

Further, optionally, the chip further includes a communication interface.

According to a twelfth aspect, this application provides a computer program product. The computer program product includes computer program code, and when the computer program code is run on a computer, the computer is enabled to perform the method in any one of the first aspect and the possible implementations of the first aspect.

According to a thirteenth aspect, this application provides a computer program product. The computer program product includes computer program code, and when the computer program code is run on a computer, the computer is enabled to perform the method in any one of the second aspect and the possible implementations of the second aspect.

DESCRIPTION OF EMBODIMENTS

The following describes the technical solutions in this application with reference to the accompanying drawings.

Figure 1:
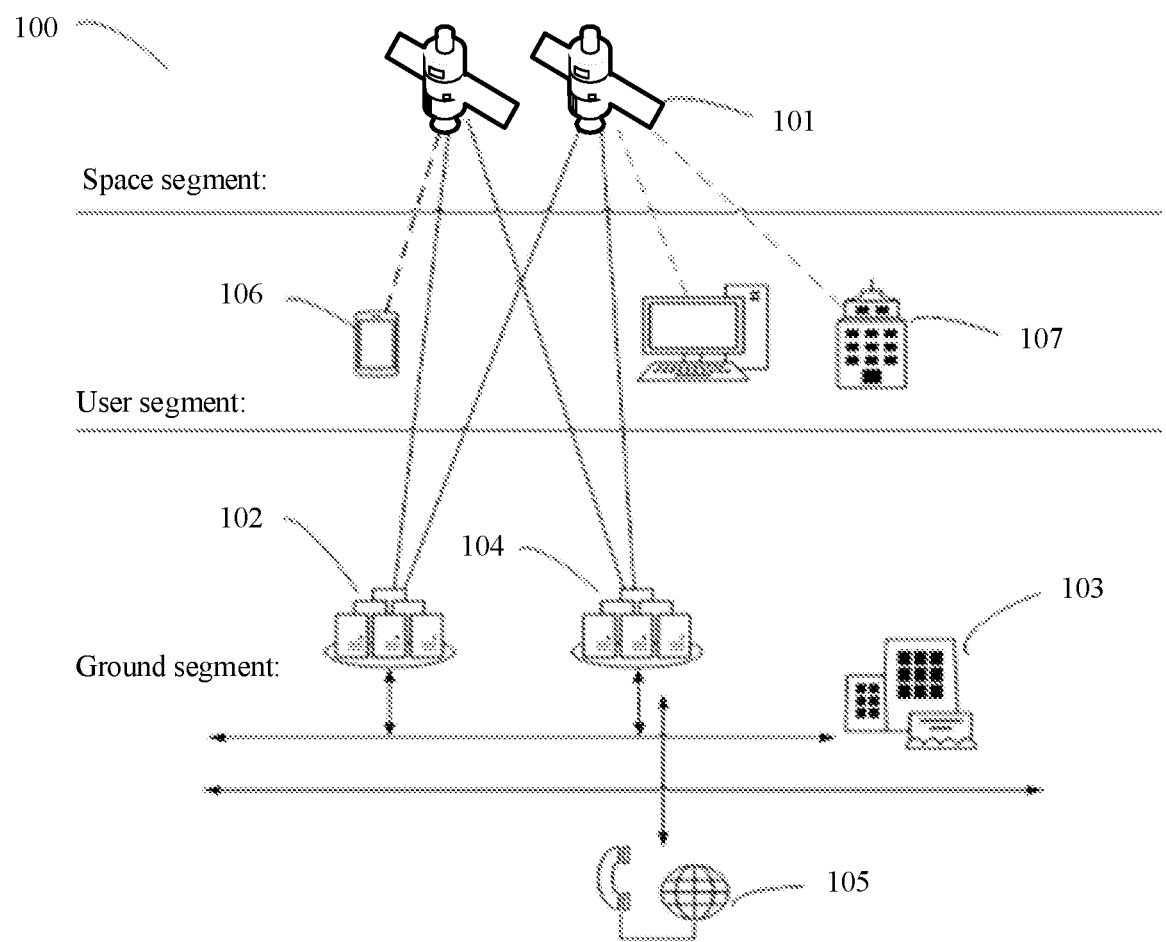
FIG. 1 is a schematic diagram depicting an architecture of a communication system according to an embodiment of this application.

The technical solutions of this application may be applied to a satellite communication system. FIG. 1 is a schematic diagram depicting an architecture of a satellite communication system according to an embodiment of this application. A satellite communication system 100 usually includes three parts: a space segment, a ground segment, and a user segment. The space segment may include a geostationary earth orbit (GEO) satellite, a non-geostationary earth orbit (NGEO) satellite, or a multi-satellite network 101 including the geostationary earth orbit satellite and the non-geostationary earth orbit satellite. The ground segment usually includes a satellite measurement and control center 102, a network control center (NCC) 103, various gateways 104, and the like. The gateway is alternatively referred to as a gateway station. The network control center is also referred to as a system control center (SCC). The user segment includes various terminal devices. A terminal device may be various mobile terminals 106 such as a mobile satellite phone, or may be various fixed terminals 107 such as a terrestrial communication station. A dashed line in FIG. 1 indicates a communication signal between a satellite and a terminal. A solid line indicates a communication signal between a satellite and a device in the ground segment. A bi-directional arrow line indicates a communication signal between network elements in the ground segment. In the satellite communication system, the satellite may also be referred to as a satellite base station. In FIG. 1, the satellite base station may transmit downlink data to the terminal device. The downlink data may be transmitted to the terminal device after channel coding and modulation mapping are performed on the downlink data. The terminal device may also transmit uplink data to the satellite base station. The uplink data may also be transmitted to the satellite base station after channel coding and modulation mapping are performed on the uplink data.

The satellite measurement and control center 102 in the ground segment has functions such as maintaining, monitoring, and controlling a satellite orbit position and satellite posture, managing a satellite ephemeris, and the like. The network control center 103 has functions such as user registration processing, identity acknowledgement, charging, and the like. In some satellite mobile communication systems, the network control center 103 and the satellite measurement and control center 102 are combined into one. The gateway 104 has functions such as a call processing and exchanging, serving as an interface to a terrestrial communication network, and the like. A ground communication network 105 is a part of the ground segment of a satellite network and is configured to exchange a data packet of the satellite to a core network and send the data packet to a final terminal device. The terrestrial communication network may be a public switched telephone network (PSTN), a public land mobile network (PLMN), or various other dedicated networks. Different terrestrial communication networks require the gateway to have different gateway functions.

In some satellite communication systems, a space segment of the satellite communication system may be a multi-layer structure including a management satellite and one or more serving satellites. In a satellite communication system network having the multi-layer structure, the space segment may include one or more management satellites and serving satellites managed by the management satellites. The satellite or the satellite base station mentioned in this application is not limited to the management satellite or a serving satellite.

The satellite base station and the terminal device include but are not limited to communicating by using the following communication systems: a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system, a future fifth generation (5G) system, new radio (NR), or the like.

In this embodiment of this application, the terminal device needs to access a mobile satellite communication network by using a ground segment of the satellite communication system to perform mobile communication. The terminal device may be referred to as user equipment (UE), an access terminal, a subscriber unit, a subscriber station, a mobile station, a remote station, a remote terminal, a mobile device, a user terminal, the terminal, a wireless communication device, a user agent, or a user apparatus. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. A terminal device represented by a satellite phone and a vehicle-mounted satellite system may directly communicate with the satellite. A fixed terminal represented by the terrestrial communication station can communicate with the satellite only after being relayed by a ground station. The terminal device sets and obtains a communication status through a wireless transceiver antenna installed on the terminal device, to complete communication.

Figures 2, 3:
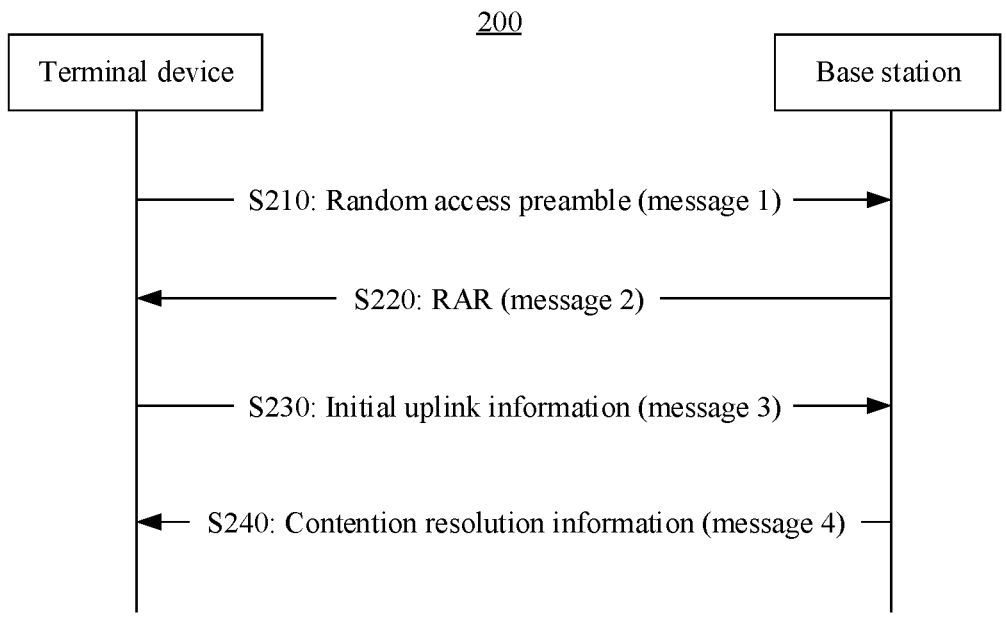
FIG. 2 is a schematic diagram depicting a random access process according to an embodiment of this application.
FIG. 3 is a schematic diagram of a satellite communication method according to an embodiment of this application.

In a wireless communication system, when communicating with a base station, the terminal device first needs to initiate a random access process. FIG. 2 is a schematic diagram 200 of a contention-based random access process, including the following steps.

S210: The terminal device sends a random access preamble to the base station based on a random access channel (RACH) resource. The random access preamble is also referred to a message 1.

For example, the RACH resource may include a random access preamble index (the random access preamble index is used to indicate the random access preamble) and/or a mask index corresponding to a random access resource, where the mask index is used to indicate a time-frequency resource for sending the random access preamble.

S220: The base station sends a random access response (RAR) to the terminal device. The random access response is also referred to as a message 2. The terminal device detects the RAR in a RAR window, where the RAR carries uplink grant information, a temporary cell radio network temporary identifier (TC-RNTI), or a timing advance (TA).

The RAR window may be a value in a set {1, 2, 4, 8, 10, 20, 40, 80}, and a unit of an element in the set is a timeslot length of an uplink signal. When a subcarrier width is 15 kHz, a maximum RAR window length is 80 ms. Specifically, the base station may broadcast which value in the set is a RAR window length by using a system information block 1 (SIB1). Optionally, if a RAR window length with a larger subcarrier width is also 80 ms., a RAR window length unit may be limited to a subframe, that is, a window length unit is 1 ms.

The uplink grant information is used to indicate a resource for sending initial uplink information. The terminal device uses the TA to learn of uplink timing.

S230: The terminal device sends the initial uplink information to the base station on the resource indicated by the uplink grant information. The initial uplink information is also referred to as a message 3 and carries a terminal device contention resolution identity (UE Contention Resolution Identity).

S240: After receiving the initial uplink information from the terminal device, the base station performs contention resolution and sends contention resolution information to the terminal device. The contention resolution information is also referred to as a message 4.

If the foregoing random access process is applied to satellite communication, because the terminal device is far away from a satellite base station is far, and therefore a delay of sending the RAR to the terminal device by the satellite base station is long in S220. If the terminal device still receives the RAR in the RAR window, the terminal device fails to receive the RAR. This results in a random access failure.

The following describes a satellite communication method 300 according to an embodiment of this application with reference to FIG. 3. The method 300 includes the following steps.

S310: A terminal device determines a first time offset of a first random access response window based on information about a distance between a satellite base station and the ground.

Figure 4:
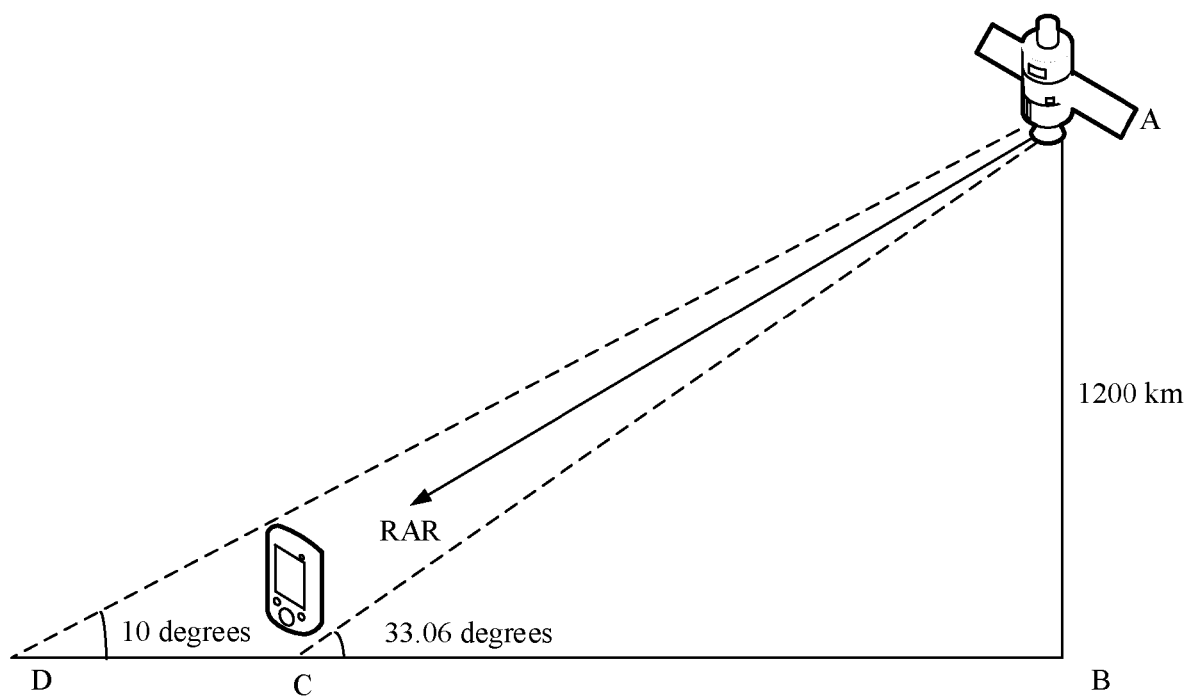
FIG. 4 is a schematic diagram of satellite communication according to an embodiment of this application.

Optionally, the information about the distance between the satellite base station and the ground may be an orbit altitude of the satellite base station (a distance between A and B shown in FIG. 4). The terminal device may learn of the orbit altitude of the satellite base station in advance.

Optionally, the information about the distance between the satellite base station and the ground may be a straight-line distance between the satellite base station and a beam or a cell in which the terminal device is located (a distance between A and C or a distance between A and D shown in FIG. 4). Alternatively, the terminal device may obtain a location of the terminal device based on a positioning system of the terminal device and obtain location information of the satellite base station based on ephemeris information of the satellite base station, to calculate a straight-line distance between the terminal device and the satellite base station.

It should be noted that, in the method 300, the terminal device determines the first time offset of the first random access response window based on example information of the satellite base station and the ground. Optionally, in this embodiment of this application, the satellite base station may alternatively determine the first time offset of the first random access response window and send (for example, may broadcast) the first time offset to the terminal device. An entity for determining the first time offset is not limited in this embodiment of this application.

Optionally, before S310, the method further includes: The satellite base station may broadcast a length of the first random access response window, and the terminal device receives the length of the first random access response window broadcast by the satellite base station. For example, the satellite base station may broadcast the length of the first random access response window by using a system information block 1. The length of the first random access response window broadcast by the satellite base station may be a value in a length set, and the length set may include a plurality of length elements. For example, the length set may be {1, 2, 4, 8, 10, 20, 40, 80}. A unit of an element in the length set is a timeslot length of an uplink signal.

In an optional embodiment, S310 includes: The terminal device determines the first time offset of the first random access response window based on information about the orbit altitude of the satellite base station and speed of light. The information about the orbit altitude of the satellite base station may be the orbit altitude of the satellite base station, an orbit altitude obtained after the orbit altitude of the satellite base station is scaled, a value obtained by adding a certain value to the orbit altitude of the satellite base station, or a value obtained by subtracting a certain value from the orbit altitude of the satellite base station. For example, the orbit altitude of the satellite base station is 1200 km and the orbit altitude of 1200 km is scaled by 1.5 times to obtain the orbit altitude of 1800 km. The information about the orbit altitude may be 1200 km or 1800 km.

The following describes two manners of determining the first time offset of the first random access response window based on the orbit altitude and the speed of light.

Manner 1: The first time offset of the first random access response window may be determined according to formula (1), that is, the first time offset is determined based on a round-trip delay.

$$M = 2d/c \quad (1)$$

where d is the orbit altitude of the satellite base station, C is the speed of light $3 \times 10^8$ m/s, and M is the first time offset.

Optionally, the manner 1 corresponds to a regeneration mode. The regeneration mode may be understood as: The terminal device sends a random access preamble to the satellite base station, the satellite base station receives the random access preamble from the terminal, and the satellite base station returns a random access response to the terminal device.

Figure 5:
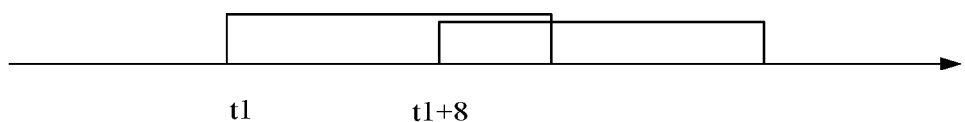
FIG. 5 is a schematic diagram depicting an offset of a first random access response window according to an embodiment of this application.

As shown in FIG. 4, for the regeneration mode, if d (a distance between A and B) is 1200 km, M is 8 ms. As shown in FIG. 5, the terminal device needs to offset a start position of a first random access response window from a position t1 to a position t1+8.

Manner 2: The first time offset of the first random access response window may be determined according to formula (2). That is, the first time offset is determined based on two times a round-trip delay.

$$M = 4d/c \quad (2)$$

where d is the orbit altitude of the satellite base station, C is the speed of light, and M is the first time offset.

Optionally, the manner 2 corresponds to a transparent transmission mode. The transparent transmission mode may be understood as: The terminal device sends a random access preamble to the satellite base station, and the satellite base station receives the random access preamble from the terminal and forwards the random access preamble to a ground station. The ground station sends a random access response to the satellite base station, and the satellite base station receives the random access response sent by the ground station and forwards the random access response to the terminal device.

Figure 6:
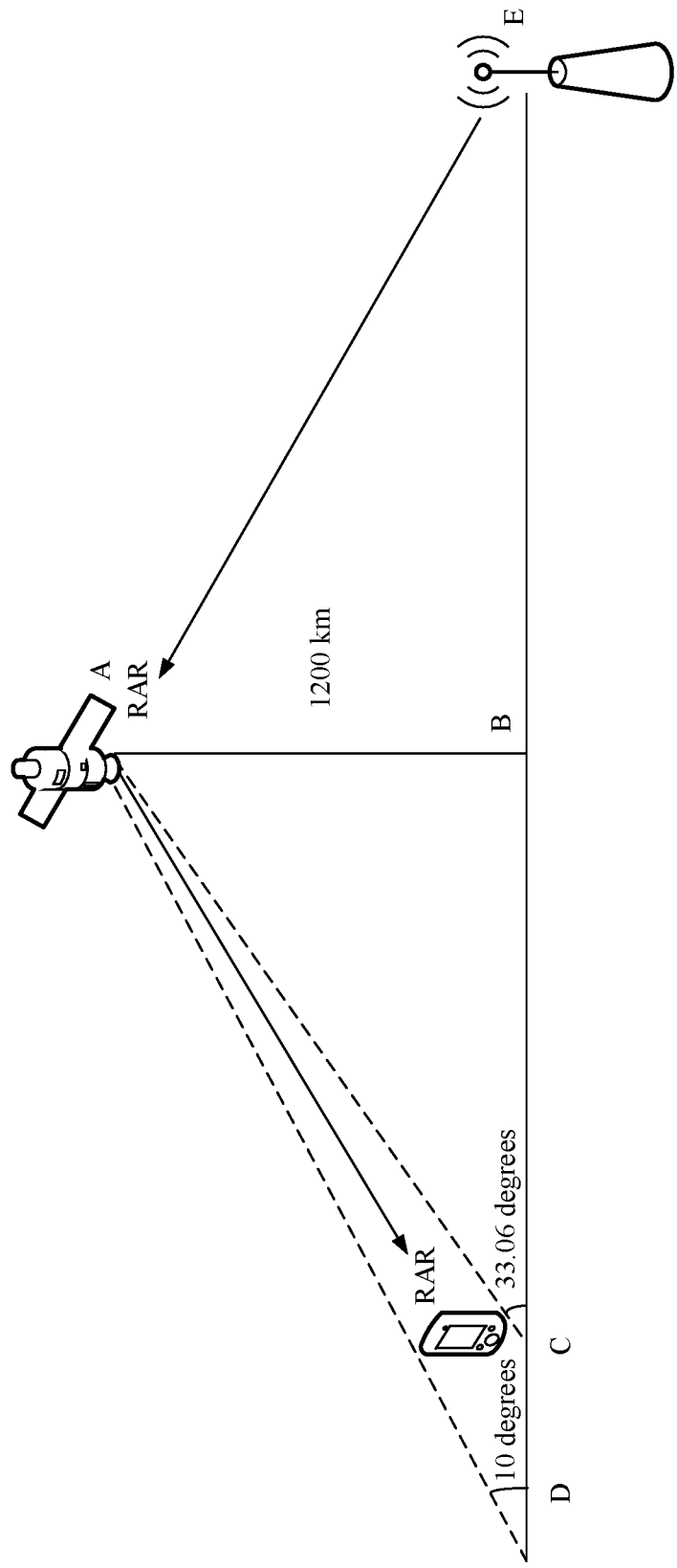
FIG. 6 is a schematic diagram of another satellite communication according to an embodiment of this application.
Figure 7:
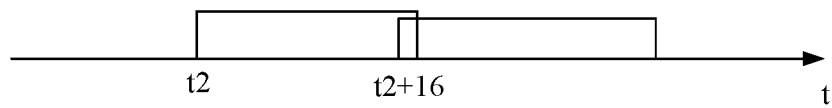
FIG. 7 is a schematic diagram depicting an offset of a first random access response window according to an embodiment of this application.

As shown in FIG. 6, for the corresponding transparent transmission mode, if d is 1200 km (a distance between A and B in the figure), M is 16 ms. As shown in FIG. 7, the terminal device needs to offset a start position of a first random access response window from a position t2 to a position t2+16.

S320: The terminal device receives, based on the first time offset and the first random access response window, the random access response sent by the satellite base station.

Specifically, S320 may be implemented in one of the following manners:

Manner 1: S320 includes: After offsetting the first random access response window by the first time offset, the terminal device receives the random access response sent by the satellite base station.

Manner 2: The satellite base station may broadcast a first scaling value, where the first scaling value is used to indicate a scaling amount of the first random access response window. The terminal device receives the first scaling value broadcast by the satellite base station. S320 includes: Scale the first random access response window based on the first scaling value to obtain a second random access response window. After offsetting the second random access response window by the first time offset, the terminal device receives the random access response sent by the satellite base station.

For example, the satellite base station may broadcast the first scaling value by using the SIB1 or through a physical broadcast channel (PBCH).

For example, if the first scaling value is 1.2 and the length of the first random access response window is 40 ms. After the 40 ms is scaled based on 1.2, a length of an obtained second random access response window is 48 ms.

Optionally, the first scaling value may have a time length, may indicate a multiple relationship, or may indicate a multiple relationship between an increased or decreased part and the first random access response window. For example, if the first scaling value is +20 ms, the length of the first random access response window is increased by 20 ms. For another example, if the first scaling value is 0.8 and the length of the first random access response window is 40 ms, the second random access response window is 32 ms. For another example, a first scaling value +0.4 indicates that the increased part is 0.4 times the length of the first random access response window. If the length of a first random access response window is 40 ms, the second random access response window is 56 ms.

Manner 3: The satellite base station may broadcast a second scaling value, where the second scaling value is used to indicate a scaling amount of the first time offset. S320 includes: The terminal device scales the first time offset based on the second scaling value to obtain a second time offset. The terminal device receives the random access response sent by the satellite base station after offsetting the first random access response window by the second time offset.

For example, the satellite base station may broadcast the second scaling value by using the SIB1 or through a PBCH.

Optionally, the second scaling value may have a time length, may indicate a multiple relationship, or may indicate a multiple relationship between an increased or decreased part and the first time offset. For example, if the second scaling value is +5 ms, the first time offset is increased by 5 ms to obtain the second time offset. For another example, if the second scaling value is 0.8 and the first time offset is 10 ms, the second time offset is 8 ms. For another example, if the second scaling value is 1.5 and the first time offset is 10 ms, 10 ms is scaled based on 1.5 to obtain the second time offset being 15 ms. For another example, a second scaling value +0.4 indicates that the added part is 0.4 times the first time offset. If the first time offset is 10 ms, the second time offset is 14 ms.

Manner 4: The satellite base station may broadcast a first scaling value and a second scaling value, where the first scaling value is used to indicate a scaling amount of the first random access response window, and the second scaling value is used to indicate a scaling amount of the first time offset.

S320 includes: The terminal device scales the first random access response window based on the first scaling value to obtain a second random access response window; the terminal device scales the first time offset based on the second scaling value to obtain a second time offset; the terminal device receives the random access response sent by the satellite base station after offsetting the second random access response window by the second time offset.

For example, the satellite base station may broadcast the first scaling value and the second scaling value by using the SIB1 or through a PBCH.

Optionally, the first scaling value may have a time length, may indicate a multiple relationship, or may indicate a multiple relationship between an increased or decreased part and the first random access response window. Optionally, the second scaling value may have a time length, may indicate a multiple relationship, or may also indicate a multiple relationship between the increased or decreased part and the first time offset. For example, if the first scaling value is 1.2 and the length of the first random access response window is 40 ms, 40 ms is scaled based on 1.2 to obtain the second random access response window being 48 ms. If the second scaling value is 1.5 and the first time offset is 8 ms, 8 ms is scaled based on 1.5 to obtain the second time offset being 12 ms. In this case, the terminal device receives the random access response sent by the satellite base station after offsetting the 48-ms second random access response window by 12 ms. For another example, if the first scaling value is +10 ms and the length of the first random access response window is 40 ms, a length of the second random access response window is 50 ms. If the second scaling value is +2 ms and the first time offset is 8 ms, the second time offset is 10 ms. In this case, the terminal device receives the random access response sent by the satellite base station after offsetting the 50-ms second random access response window by 10 ms. For another example, a first scaling value +0.4 indicates that the increased part is 0.4 times the length of the first random access response window. If the length of the first random access response window is 40 ms, the second random access response window is 56 ms. A second scaling value +0.4 indicates that the added part is 0.4 times the first time offset. If the first time offset is 10 ms, the second time offset is 14 ms. The terminal device receives the random access response sent by the satellite base station after offsetting the 56-ms second random access response window by 14 ms.

It should be understood that the method 300 may be applied to any scenario in which random access needs to be performed in satellite communication. The terminal device may adjust a first random access response window for receiving the random access response, to more accurately receive the random access response sent by the satellite base station.

Figure 8:
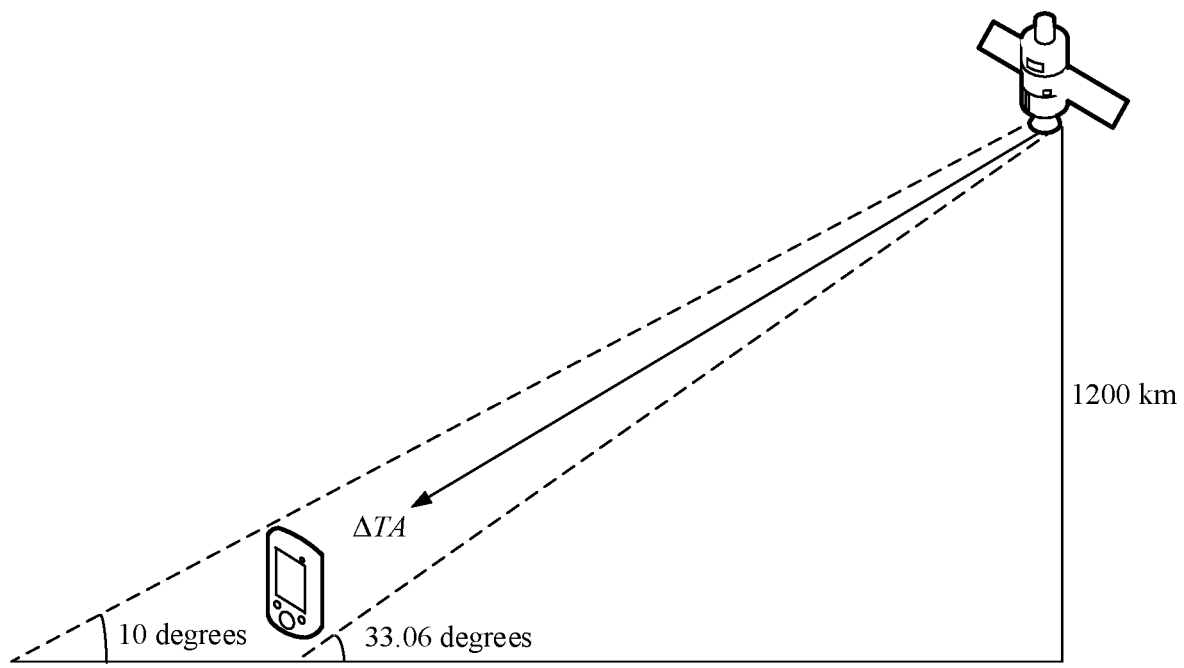
FIG. 8 is a schematic diagram of another satellite communication according to an embodiment of this application.
Figure 9:
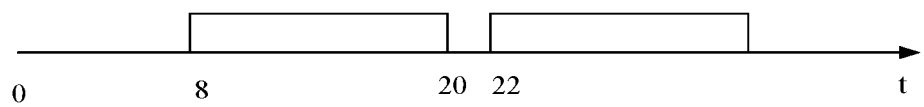
FIG. 9 is a schematic diagram depicting an offset of a random access preamble window according to an embodiment of this application.

In an optional embodiment, because the terminal device is far away from the satellite base station, before the terminal device initiates the random access, the satellite base station may broadcast a common timing advance (common TA). The common TA is obtained based on a distance between the satellite base station and a group of terminal devices (the distance may be a closest distance to the satellite base station in one beam or one cell, or a distance between a center of the beam or the cell and the satellite base station). The common TA is used to indicate a time value at which the terminal device sends the random access preamble in advance. The terminal device advances, based on the TA broadcast by the satellite base station, time for sending the random access preamble by a value indicated by the common TA. After the terminal device sends the random access preamble, the terminal device may receive the random access response after the random access response window for receiving the random access response is postponed by the value indicated by the common TA. During actual application, because the terminal device is far away from the satellite base station, a common TA calculated by the satellite base station is large and large overheads are required for broadcasting the common TA by the satellite base station. To reduce signaling overheads, the satellite base station may broadcast a portion of the TA and the terminal device adjusts the time for sending the random access preamble based on the portion of the TA. A network device adjusts a window for receiving the random access preamble based on a TA obtained by subtracting the portion of the TA from the common TA, to accurately receive the random access preamble. As shown in FIG. 8, the satellite base station obtains a common TA that is $$14.67 \text{ ms} \left( \frac{1200000 * 2}{300000000 * \sin(33.06°)} \right)$$

based on a distance from the terminal device. The satellite base station broadcasts only a portion of the TA that is 0.67 ms and does not broadcast the remaining portion that is 14 ms. This saves four bits of overheads. The terminal device may advance time for sending a random access preamble by 0.67 ms and the network device may postpone a window for receiving the random access preamble by 14 ms. As shown in FIG. 9, it is assumed that a length of a window of receiving the random access preamble is 12 ms. In the window of receiving the preamble on the satellite base station side, the random access preamble is started to be received originally at 8 ms. Therefore, the satellite base station postpones a start position of the random access preamble by 14 ms, so that the random access preamble is started to be received at 22 ms. This can achieve uplink and downlink alignment.

In the foregoing embodiment, the satellite base station broadcasts the portion of the TA. If the terminal device adjusts the random access response window based on the portion of the TA, the adjusted random access response window is incorrect. As a result, the terminal device cannot receive the random access response. In the method 300, the terminal device may not adjust the random access response window based on the portion of the TA. After offsetting the first random access response window by the first time offset obtained through calculation in the method 300, the terminal device receives the random access response sent by the satellite base station.

It should be noted that the scaling value mentioned in this embodiment of this application may also be referred to as a scaling coefficient. This is not limited herein.

It should also be noted that, in this embodiment of this application, the satellite base station broadcasts both the first scaling value and the first random access response window. The satellite base station may broadcast different scaling values or a same scaling value based on different random access response windows. Optionally, the satellite base station may concurrently or may separately broadcast the first scaling value and the first random access response window. Optionally, the satellite base station may concurrently or may separately broadcast the first scaling value and the second scaling value. This is not limited herein.

Optionally, the satellite base station broadcasts different scaling values in different application scenarios. For example, in a scenario with a large quantity of terminal devices, correspondingly there are also more terminal devices initiating random access. In this case, the satellite base station may broadcast a larger first scaling value and the terminal device that receives the first scaling value can expand a first random access response window, to better receive a random access response.

The satellite communication method provided in this embodiment of this application may be applied to contention-based random access or non-contention-based random access. This is not limited herein.

Figure 10:
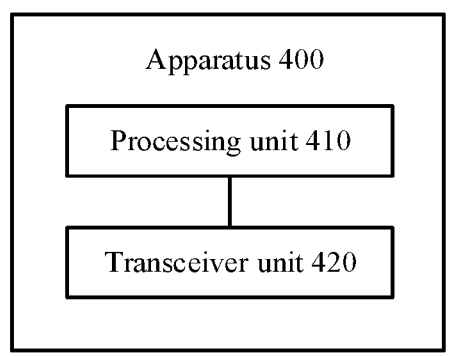
FIG. 10 is a schematic block diagram of a satellite communication apparatus according to an embodiment of this application.
Figure 11:
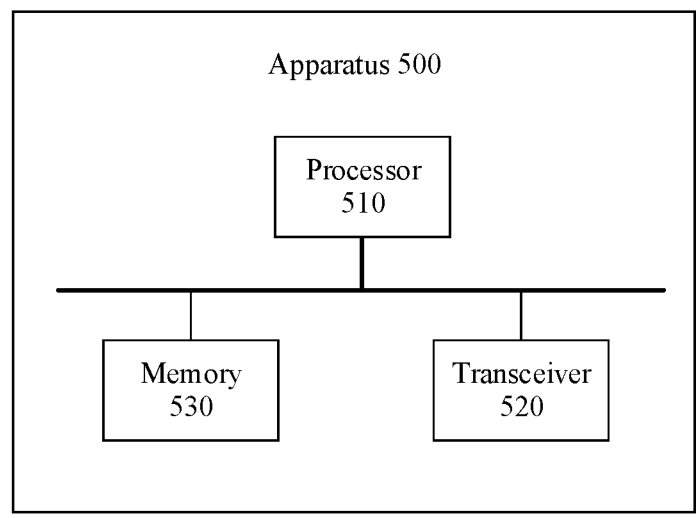
FIG. 11 is a schematic block diagram of another satellite communication apparatus according to an embodiment of this application.

With reference to FIG. 1 to FIG. 9, the foregoing describes in detail the satellite communication method in the embodiments of this application. With reference to FIG. 10 and FIG. 11, the following describes in detail a satellite communication apparatus provided in this embodiment of this application.

FIG. 10 is a schematic block diagram of a satellite communication apparatus 400 according to an embodiment of this application. The apparatus 400 may correspond to the terminal device described in the foregoing method, or may correspond to a chip or a component of the terminal device. Modules or units in the apparatus 400 may be separately configured to perform actions or processing processes performed by the terminal device in the foregoing methods. As shown in FIG. 10, the satellite communication apparatus 400 may include a processing unit 410 and a transceiver unit 420.

The processing unit 410 is configured to determine a first time offset of a first random access response window based on information about a distance between a satellite base station and the ground.

The transceiver unit 420 is configured to receive, based on the first time offset and the first random access response window, a random access response sent by the satellite base station.

In an optional embodiment, the processing unit 410 is specifically configured to:
determine the first time offset of the first random access response window based on information about an orbit altitude of the satellite base station and speed of light.

In an optional embodiment, the processing unit 410 is specifically configured to:
determine the first time offset of the first random access response window according to the following formula (1) or (2):

$$M = 2d/c \qquad (1)$$
$$M = 4d/c \qquad (2)$$

where d is the orbit altitude of the satellite base station, C is the speed of light, and M is the first time offset.

In an optional embodiment, the transceiver unit 420 is further configured to:
receive a first scaling value sent by the satellite base station, where the first scaling value is used to indicate a scaling amount of the first random access response window.

The processing unit 410 is further configured to scale the first random access response window based on the first scaling value to obtain a second random access response window.

The transceiver unit 420 is further configured to receive the random access response sent by the satellite base station after offsetting the second random access response window by the first time offset.

In an optional embodiment, the transceiver unit 420 is further configured to:
receive a second scaling value sent by the satellite base station, where the second scaling value is used to indicate the scaling amount of the first time offset.

The processing unit 410 is further configured to:
scale the first time offset based on the second scaling value to obtain a second time offset; and
receive the random access response sent by the satellite base station after offsetting the first random access response window by the second time offset.

In an optional embodiment, the transceiver unit 420 is further configured to receive the first scaling value and the second scaling value that are sent by the satellite base station, where the first scaling value is used to indicate the scaling amount of the first random access response window and the second scaling value is used to indicate a scaling amount of the first time offset.

The processing unit 410 is further configured to: scale the first random access response window based on the first scaling value to obtain the second random access response window and scale the first time offset based on the second scaling value to obtain the second time offset. The transceiver unit 420 is further configured to receive the random access response sent by the satellite base station after offsetting the second random access response window by the second time offset.

It should be understood that, for a specific process of performing the foregoing corresponding steps by the units in the apparatus 400, refer to the foregoing descriptions about the method embodiments with reference to FIG. 3 to FIG. 9. For brevity, details are not described herein again.

The apparatus 400 in the foregoing solutions has functions of performing corresponding steps performed by the terminal device in the foregoing methods. The functions may be implemented by using hardware, or may be implemented by hardware executing corresponding software. The hardware or the software includes one or more modules corresponding to the foregoing function. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In a specific implementation process, the processor may be configured to perform, for example, but not limited to, baseband related processing. The transceiver may be configured to perform, for example, but not limited to, radio frequency receiving and sending. The foregoing components may be separately disposed on chips independent of each other, or at least some or all of the components may be disposed on one chip. For example, the processor may be further classified into an analog baseband processor and a digital baseband processor. The analog baseband processor and the transceiver may be integrated into a same chip, and the digital baseband processor may be disposed on a stand-alone chip. With continuous development of integrated circuit technologies, an increasing quantity of components may be integrated on one chip. For example, the digital baseband processor and a plurality of application processors (for example, but not limited to a graphics processing unit and a multimedia processor) may be integrated into one chip. Such a chip may be referred to as a system on chip (system on chip, SOC). Whether to separately dispose the components on different chips or integrate the components into one or more chips depends on a specific product design requirement. Specific implementations of the foregoing components are not limited in this embodiment of this application.

It can be understood that the processor in the foregoing embodiments may implement a function in any design in the foregoing embodiments of this application by executing program instructions by a hardware platform having a processor and a communication interface. Based on this, as shown in FIG. 11, this embodiment of this application provides a schematic block diagram of a satellite communication apparatus 500. The apparatus 500 includes a processor 510, a transceiver 520, and a memory 530. The processor 510, the transceiver 520, and the memory 530 communicate with each other by using an internal connection path. The memory 530 is configured to store instructions, and the processor 510 is configured to execute the instructions stored in the memory 530, to control the transceiver 520 to send a signal and/or receive a signal.

The processor 510 is configured to determine the first time offset of the first random access response window based on the information about the distance between the satellite base station and the ground. The transceiver 520 is configured to receive, based on the first time offset and the first random access response window, the random access response sent by the satellite base station.

It should be understood that the apparatus in FIG. 10 in this embodiment of this application may be implemented by using the apparatus 500 in FIG. 11, and may be configured to perform steps and/or procedures corresponding to the terminal device in the foregoing method embodiments.

It may be understood that the methods, the procedures, the operations, or the steps in the designs described in the embodiments of this application can be implemented in one-to-one correspondence by using computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing program instructions. For another example, in consideration of aspects such as system performance and reliability, these functions may be implemented by using a dedicated circuit. A person of ordinary skill in the art may implement the described functions by using different methods for each particular application. This is not limited herein.

According to the method provided in the embodiments of this application, this application further provides a computer program product. The computer program product includes computer program code. When the computer program code is run on a computer, the computer is enabled to perform the method in the foregoing embodiments. The embodiments in this application may also be combined with each other.

According to the method provided in this embodiment of this application, this application further provides a computer-readable medium. The computer-readable medium stores program code. When the program code is run on a computer, the computer is enabled to perform the method in the foregoing embodiments.

In this embodiment of this application, it should be noted that the foregoing method embodiments in this embodiment of this application may be applied to the processor, or may be implemented by the processor. The processor may be an integrated circuit chip and has a signal processing capability. In an implementation process, steps in the foregoing method embodiments may be implemented by using a hardware integrated logical circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in this embodiments of this application. The general-purpose processor may be a microprocessor, or the processor may be any conventional processor, or the like. The steps of the methods disclosed with reference to this embodiment of this application may be directly presented as being performed and completed by a hardware decoding processor, or performed and completed by a combination of hardware and a software module in a decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in this embodiment of this application may be a volatile memory or a non-volatile memory, or may include a volatile memory and a nonvolatile memory. The nonvolatile memory may be the read-only memory (ROM), the programmable read-only memory (PROM), an erasable programmable read-only memory (EPROM), the electrically erasable programmable read-only memory (EEPROM), or the flash memory. The volatile memory may be a random access memory (RAM) that is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that sequence numbers of the foregoing processes do not mean execution sequences in various embodiments of this application. The execution sequences of the processes should be determined according to functions and internal logic of the processes, and should not be constructed as any limitation on the implementation processes of this embodiment of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more preferred or more advantageous than another embodiment or design. Specifically, using these words is intended to present a related concept in detail.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

All or some of the foregoing embodiments may be implemented by using the software, the hardware, firmware, or any combination thereof. When the software is used to implement the embodiments, all or some of the embodiments may be implemented in a form of the computer program product. The computer program product may include one or more computer instructions. When the computer program instructions are loaded and executed on the computer, the procedure or functions according to this embodiment of this application are all or partially generated. The computer may be the general-purpose computer, a dedicated computer, a computer network, or other programmable apparatuses. The computer instructions may be stored in a computer-readable storage medium or may be transmitted from the computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on specific application and the design constraint of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A satellite communication method, applicable for a terminal device, a chip of the terminal device or a component of the terminal device, comprising:

determining, a first time offset of a first random access response window;

receiving, a scaling value, wherein the scaling value indicates a scaling amount of the first time offset; and receiving, a random access response in the first random access response window after offsetting a starting position of the first random access response window by a second time offset, wherein the second time offset is obtained by adding the scaling value to the first time offset.

2. The method according to claim 1, wherein the determining, a first time offset of a first random access response window comprises:

determining, the first time offset of the first random access response window based on an orbit altitude information of a satellite base station and speed of light.

3. The method according to claim 1, wherein the scaling value is a second scaling value, and wherein the method further comprises:

receiving, a first scaling value indicating a scaling amount of the first random access response window; and the receiving the random access response comprises:

scaling, the first random access response window based on the first scaling value to obtain a second random access response window; and receiving, the random access response after offsetting the second random access response window by the second time offset.

4. The method according to claim 1, wherein the receiving the scaling value comprises:

receiving the scaling value in a broadcast message.

5. The method according to claim 1, the first timing offset is determined based on a position of the terminal device and ephemeris information of a satellite.

6. The method according to claim 5, wherein the ephemeris information indicates location information of the satellite.

7. The method according to claim 6, wherein the first timing offset is determined based on a distance information between a satellite base station and a ground, wherein the distance information the satellite base station and the ground is determined based on the ephemeris information.

8. A satellite communication method, applicable for a satellite base station, comprising:

sending, a scaling value to a first terminal device, wherein the scaling value indicates a scaling amount of a first time offset of a first random access response window that is determined by the first terminal device, wherein scaling value is usable for offsetting a starting position of the first random access response window by a second time offset, wherein the second time offset is a sum of the scaling value and the first time offset; and sending, a random access response to the first terminal device.

9. The method according to claim 8, wherein the second time offset is determined based on a common timing advance and a partial common timing advance, wherein the partial common timing advance is sent by the satellite base station to the first terminal device.

10. The method according to claim 8, wherein the sending the scaling value comprises:

sending the scaling value in a broadcast message.

11. The method according to claim 8, the first timing offset is determined based on a position of the first terminal device and ephemeris information of a satellite.

12. The method according to claim 11, wherein the ephemeris information indicates location information of the satellite.

13. The method according to claim 12, wherein the first timing offset is determined based on a distance information between the satellite base station and a ground, wherein the distance information the satellite base station and the ground is determined based on the ephemeris information.

14. A communication apparatus, comprising:

at least one processor; and one or more memories including computer-executable instructions that, when executed by the at least one processor, cause the communication apparatus to:

determine a first time offset of a first random access response window;

receive a scaling value, wherein the scaling value indicates a scaling amount of the first time offset; and receive, a random access response in the first random access response window after offsetting a starting position of the first random access response window by a second time offset, wherein the second time offset is obtained by adding the scaling value to the first time offset.

15. The communication apparatus according to claim 14, wherein the computer-executable instructions, when executed by the at least one processor, cause the communication apparatus to:

determine the first time offset of the first random access response window based on an orbit altitude information of a satellite base station and speed of light.

16. The communication apparatus according to claim 14, wherein the scaling value is a second scaling value, and wherein the computer-executable instructions, when executed by the at least one processor, further cause the communication apparatus to:

receive a first scaling value indicating a scaling amount of the first random access response window;

scale the first random access response window based on the first scaling value to obtain a second random access response window; and receive the random access response after offsetting the second random access response window by the second time offset.

17. The communication apparatus according to claim 14, wherein the receive the scaling value comprises:

receive the scaling value in a broadcast message.

18. The communication apparatus according to claim 14, the first timing offset is determined based on a position of the communications apparatus and ephemeris information of a satellite.

19. The communication apparatus according to claim 18, wherein the ephemeris information indicates location information of the satellite.

20. The communication apparatus according to claim 19, wherein the first timing offset is determined based on a distance information between the satellite base station and a ground, wherein the distance information the satellite base station and the ground is determined based on the ephemeris information.

* * * * *